United States Patent
Garg

(10) Patent No.: US 10,007,667 B2
(45) Date of Patent: Jun. 26, 2018

(54) SYSTEMS AND METHODS FOR DOCUMENT MANAGEMENT FOR SHARING DOCUMENTS ACCORDING TO DOCUMENT CATEGORY

(71) Applicant: 8318808 Canada Inc., Milton (CA)

(72) Inventor: Neeraj Garg, Milton (CA)

(73) Assignee: 8318808 CANADA INC., Milton (CA)

( * ) Notice: Subject to any disclaimer, the term of this patent is extended or adjusted under 35 U.S.C. 154(b) by 311 days.

(21) Appl. No.: 14/852,853

(22) Filed: Sep. 14, 2015

(65) Prior Publication Data

US 2017/0075976 A1 Mar. 16, 2017

(51) Int. Cl.
*G06F 17/30* (2006.01)

(52) U.S. Cl.
CPC .... *G06F 17/30011* (2013.01); *G06F 17/3053* (2013.01); *G06F 17/30598* (2013.01)

(58) Field of Classification Search
None
See application file for complete search history.

(56) References Cited

U.S. PATENT DOCUMENTS

| | | | | |
|---|---|---|---|---|
| 2009/0313236 A1* | 12/2009 | Hernacki | .......... | G06F 17/30796 |
| 2010/0017388 A1* | 1/2010 | Glover | ............. | G06F 17/30867 |
| | | | | 707/E17.001 |
| 2013/0050756 A1* | 2/2013 | Hosotsubo | ........ | G06F 17/30011 |
| | | | | 358/1.15 |
| 2013/0157234 A1* | 6/2013 | Gulli | ..................... | G09B 19/00 |
| | | | | 434/154 |
| 2015/0088940 A1* | 3/2015 | Stokely | ............. | G06F 17/30194 |
| | | | | 707/827 |
| 2015/0156274 A1* | 6/2015 | Alten | ................... | H04L 67/306 |
| | | | | 709/204 |

* cited by examiner

*Primary Examiner* — Son T Hoang
(74) *Attorney, Agent, or Firm* — Marc Lampert; Anil Bhole; Bhole IP Law

(57) ABSTRACT

Systems and methods for document management for sharing documents according to document categories, wherein an author can generate a document for sharing, specify a document category for the document, and share the document or the category. Upon accessing a shared document by a recipient, the recipient may be prompted to access the most relevant document of the document category. The recipient may thus receive a link to a shared document and, upon invoking the link, instead of being directed to the shared document, may be directed to a subsequently authored, or otherwise more relevant document from the document category. The determination of relevancy may relate to the age of a document.

16 Claims, 4 Drawing Sheets

SYSTEMS AND METHODS FOR DOCUMENT MANAGEMENT FOR SHARING DOCUMENTS ACCORDING TO DOCUMENT CATEGORY

TECHNICAL FIELD

The following relates generally to systems and methods for document management and more specifically for sharing documents according to a document category.

BACKGROUND

Electronic documents can be shared by an author with a recipient, or a plurality of recipients (referred to herein as "users") using commonly available services and applications, In a simple implementation, electronic mail applications often permit the attachment of documents to electronic mail for communication to an intended recipient. Alternately, cloud applications, such as Dropbox™, allow an author to send a link to a recipient which, when invoked, provides access to a document, which may be stored on a database accessible over a network.

In some cases, document authors share documents that may be extrinsically related to other documents. Examples of extrinsic relations include (a) subsequent versions of a document, (b) documents having shared document content, (c) documents having a shared document identification number, and (d) documents having a shared parent document.

Various systems and methods have been proposed for tracking extrinsically related documents. Such systems may, for example, attempt to prevent a recipient from accessing an outdated version of a shared document. U.S. Pat. No. 7,836,019 describes, in an embodiment, when a user opens one of the documents that was downloaded from the document management storage, a check is performed to determine whether the document opened is the most recent version. This check may be performed in an embodiment by comparing unique identifiers of the two copies of the document (e.g., the copy residing on the user's desktop and the copy stored by the document management system). In an embodiment, if the user's copy of the document is not the most recent version, a message may be sent to the user asking if the user wants to have the user's copy updated.

SUMMARY

In one aspect, a system for sharing electronic documents is provided, the system comprising: an electronic document repository configured to store a plurality of documents and a document category index for assigning at least one of a plurality of document categories to each such document; and a document management module communicatively linked to the electronic document repository, the document management module configured to: receive from an author device one or more documents having document content and document properties and store the documents to the electronic document repository; receive a request to share a shared document selected from the documents; share the shared document by generating a sharing link and communicating the sharing link to a recipient device; obtain, in response to the recipient device accessing the sharing link, a request for access to the shared document; generate relevance scores for the shared document and each document having a common document category with the shared document; determine a most relevant document by comparing the relevance scores; and provide the recipient device access to the most relevant document.

In another aspect, a method for sharing electronic documents is provided, the method comprising: establishing an electronic document repository configured to store a plurality of documents, and a document category index for assigning at least one of a plurality of document categories to each such document; and receiving from an author device, at a document management module, one or more documents having document content and document properties and storing the documents to the electronic document repository; receiving a request to share a shared document selected from the documents; sharing the document by generating a sharing link and communicating the sharing link to a recipient device; obtaining, in response to the recipient device accessing the sharing link, a request for access to the shared document; generating relevance scores for the shared document and each document having a common document category with the shared document; determining a most relevant document by comparing the relevance scores; and providing the recipient device access to the most relevant document.

In another aspect, a system for sharing electronic documents is provided, the system comprising: an electronic document repository configured to store a plurality of documents and a document category index for assigning at least one of a plurality of document categories to each such document; and a document management module communicatively linked to the electronic document repository, the document management module configured to: receive from an author device one or more documents and store the documents to the electronic document repository; receive a request to share a document category; share the document category by generating a sharing link for the documents assigned to the document category and communicating the sharing link to a recipient device; obtain, in response to the recipient device accessing the sharing link, a request for access to the documents assigned to the document category; generate relevance scores for each of the documents assigned to the document category; determine a most relevant document for the document category by comparing the relevance scores; and provide the recipient device access to at least the most relevant document.

These and other aspects are contemplated and described herein. It will be appreciated that the foregoing summary sets out representative aspects of systems and methods for document management for sharing documents according to document category to assist skilled readers in understanding the following detailed description.

DESCRIPTION OF THE DRAWINGS

A greater understanding of the embodiments will be had with reference to the Figures, in which.

DETAILED DESCRIPTION

Figure 1:
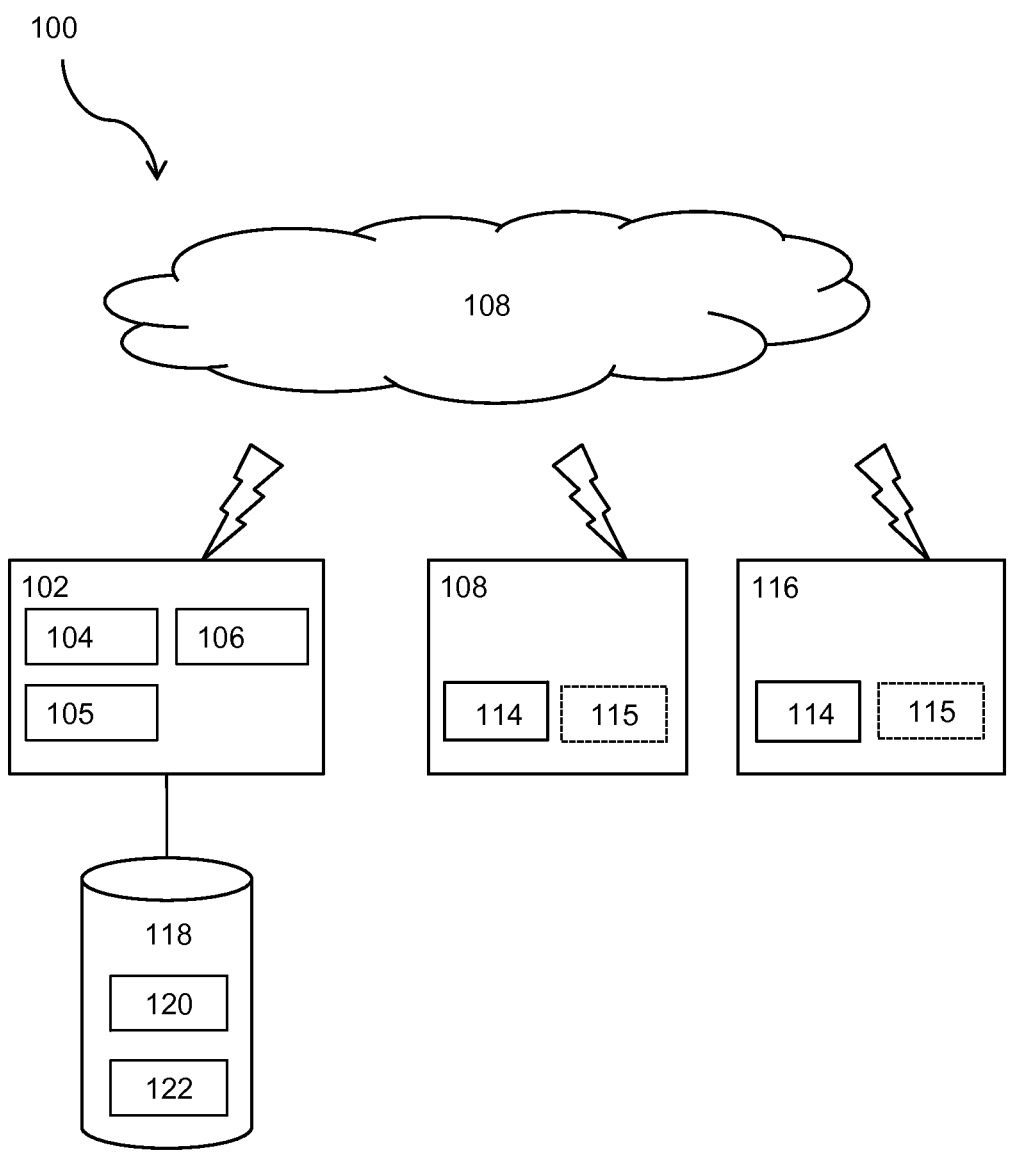
FIG. 1 shows a system for document management for sharing documents according to document category.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

Document authors may periodically share documents related in some way, but not necessarily having any properties to extrinsically evidence the relationship. Such a relationship is referred to herein as a "category", which indicates documents having a common type or purpose, which may not be explicitly reflected in document properties. A shared document purpose might encompass documents that are intended to be used in a similar way.

It may be desired to ensure that when a recipient accesses a link to a shared document belonging to a document category, the recipient is directed to the most relevant document of the document category. According to known systems, if a recipient saves or bookmarks a link to a shared document, the link will continue to direct the recipient to a version of the document, and not to a more relevant document of the document category.

For example, an author might periodically share reports each relating to a given business unit, such that all the reports relate to the same category. Once such a report is shared it may be 'absolute', in the sense that it doesn't need to be modified, or it might not be subsequently edited by recipients and/or the author. In instances where a document is edited, it may be desired to ensure that a recipient accessing a shared document accesses the most recent version of the shared document when accessing a link to a shared document, as permitted by traditional systems described above. However, once a new report is shared—whether each report is 'absolute' or not, the new report may render the old report obsolete. In such instances, an author might desire that upon invoking a link to the old report, the recipient would instead be directed to the new report—which is now more relevant. However in traditional systems as described above, document version tracking may be related to a particular document ID, such that if a new document is shared related in category to a previous document, but not having a common document ID, upon a user accessing a link to the previously shared document, the user would be directed to an obsolete document.

Further, for example, an architectural firm may generate a variety of documents relating to a particular building, all of which relate to a particular document category. Each of the documents may have a plurality of versions. For example, a particular document might comprise plans for an East quadrant of the building, which may be saved in a plurality of versions as a result of editing by different parties. However, according to current systems, upon accessing a shared document, the user either accesses an outdated version of the shared document or may be prompted to access the most recent version of the particular document (e.g. plans for the East quadrant), without regard to whether the user should instead be prompted to access a more relevant document of the document category. It may be desired that, upon accessing a shared document, the user is not merely prompted to access the most recent version of a particular document (e.g. plans for the East quadrant), but is prompted to access the most relevant document of the document category (i.e. the most relevant document of all the documents relating to a particular category, such as the building).

Described herein are embodiments of systems and methods for document management for sharing documents according to document categories, wherein an author can generate a document for sharing, specify a document category for the document, and share the document or the category. Upon accessing a shared document by a recipient, the recipient may be prompted to access the most relevant document of the document category. The recipient may thus receive a link to a shared document and, upon invoking the link, instead of being directed to the shared document, may be directed to a subsequently authored, or otherwise more relevant document from the document category. The determination of relevancy may relate to the age of a document, but is not so limited.

As described above, document authors, such as individuals and companies, periodically produce and share documents having the same document category. Documents related in category may not necessarily have not have any extrinsic properties to evidence the categorization—such as metadata, shared content, a shared document ID, or a shared parent/root document. Further a given document may be associated with multiple categories.

Various document categories are contemplated by the embodiments described herein. Examples document categories are provided for clarity of illustration, but are not in any way limiting. For example, in the financial services industry, an individual might generate and share documents according of a category titled "financial statements" comprising quarterly financial statements and annual financial statements, the purpose of the category being to provide recipients with the most recent financial statement for the executive's company. A further category might be limited to quarterly financial statements. A company's quarterly financial statement may only be relevant to investors until a new quarterly financial statement is released. Accordingly, some documents may be classified into several categories. As a further example of a document categorization, a regulatory body might produce documents such as "standard agreements" for real-estate sales. A standard agreement may only be relevant until a newer version or replacement for an agreement is authored.

Referring now to FIG. 1, shown therein is an embodiment of a system for document management for sharing documents according to a document category.

The system 100 comprises a server 102, an author device 108, and a recipient device 116.

The server 102 comprises or is communicatively linked to a database 118 for storing documents 120 and associated document information 122. The server may be a hardware server, or may be a virtualized server. The document information 122 comprises information associating each document with a category. The database 118 may further comprise user information for users of the system, such as user credentials. The server may host a document management module 105 and an associated user interface accessible over a network 108 for the server ("web interface"). Network 108 may be a wired or wireless communication network. The document management module 105 may provide access to document management services hosted at the server, the functionality of which is described herein. The server 102 may comprise a processing module 106 for processing documents 120 and document information 122 in conjunction with application program instructions, such as to determine relevancy of documents or to generate document categories.

The author device 108 is a computing device for provisioning a document for sharing by a user. The user desiring to share a document is referred to herein for simplicity as the "author" of the shared document, whether or not they actually composed the document. The author device may comprise an input device 114. The input device comprises a user interface device, such as a touchscreen or a computer peripheral for facilitating data entry to the author device 108.

The recipient device 116 is a computing device for accessing a shared document by an intended recipient of a shared document. The recipient device may similarly comprise an input device 114.

Figure 2:
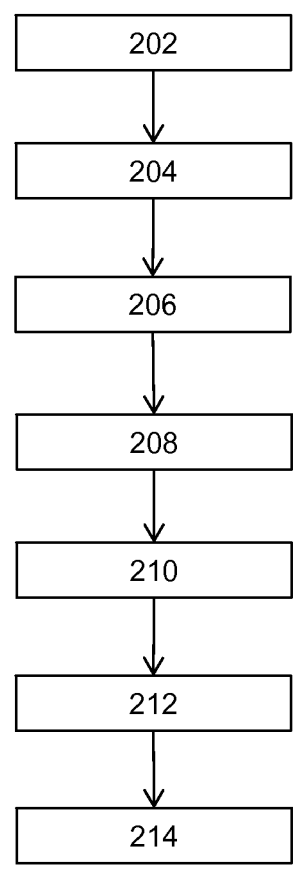
FIG. 2 shows a method for document management for sharing documents according to document category.

Referring now to FIG. 2, shown therein is an embodiment of a method 200 for document management for sharing documents according to document category in conjunction with the system 100. The method 200 comprises a server-based implementation of the systems and methods, where the author device and recipient devices are not required to install a client-side application 115. Interaction with users in the steps below is carried out by providing a web interface of the document management module 105 accessible to users for interacting with them for providing the described functionality.

At block 202, an author selects and uploads a document for sharing. The document may be uploaded to server 102 over a network 108 for sharing. Various methods for uploading the document to the server are contemplated. In one embodiment, in order to upload the document, the author may navigate a browser to the web interface for accessing services of the document management module 105, and for allowing document uploading. The author may provide user information such as user credentials to log on to the system prior to being able to upload a document. Once uploaded, the document is associated with the author in the document information 122 based on the author's user information. Alternately, the system may determine user information for associating the document with the author, such as by associating the document with an IP address of the author device.

At block 204, upon uploading the document, the author may be requested to input a document category, which may thereafter be stored at the server as document information 122 in association with the uploaded document. Once uploaded to the server, or during uploading, the document may be encrypted according to known cryptographic standards.

In an embodiment, upon uploading the document, a processing module 106 of the server processes the document in order to generate a category. The generated category may be provided to the author as a suggested category for the document. The document category may be one of a predetermined set of categories. In embodiments, the processing module comprises a classification module for sorting uploading documents into categories from a predetermined set of categories. A classification module may comprise a trained neural network for sorting an uploaded document into one or more predetermined categories. The neural network may be trained on a dataset of documents with known categories. The processing may comprise assessing the content of the document, such as the subject, title and/or body of the document, such as keywords comprised therein and their relative or absolute frequency. Weighting factors may be implemented such that, for example, the title of the document is afforded more weight with respect to a proposed classification than the words comprised within the document.

At block 206, once one or more documents have been uploaded to the server by the author, the author invokes a sharing mechanism of the document management module 105 for sharing the uploaded document with a recipient. Various methods to select a document for sharing are contemplated. In an embodiment, the web interface of the document management module 105 allows the author to select a document for sharing. Optionally, sharing may occur automatically once a document is uploaded and assigned to a category.

An author may not need to have uploaded a document to share it. An author could assign permission to another user to share the author's uploaded documents. A recipient could automatically receive permission to share any received document upon the receipt thereof.

At block 208, a link is generated for sharing the selected document. The link may be copied by the author for manual transmission by the author to the recipient. In embodiments, the link comprises a hyperlink which can be accessed by a browser to direct a recipient to the shared document.

Optionally, the author might input user information for a recipient, such as an email address, so that the generated link can be automatically transmitted to the recipient. Each generated link may be customized to and associated with each recipient and the association may be stored as document information 122, such that the system may have an indication when each recipient invokes a shared link.

At block 210, the recipient invokes the link for accessing the selected document. Upon the recipient invoking the link, the recipient is directed to the web interface of the document management module. A record may be stored at the server indicating that the particular recipient has invoked the link.

At block 212, once the link is invoked, the document management module verifies if the document indicated by the link is the most relevant document of the document category. To verify if the document indicated by the link is the most relevant document, the processing module 106 may process documents in a document category to determine if the document linked to is the most relevant document of the author's documents in that category. The processing module 106 may provide a relevance score for each document in a category in order to determine the most relevant document. If the author has only uploaded a single document, then that document is the most relevant. Conversely, if the author has uploaded multiple documents the processing module 106 processes the documents and optionally their properties to determine which document is the most relevant. In an embodiment, the processing is limited to ordering relevancy according date of uploading, such that the most recently uploaded document is the most relevant. After uploading a document, the author might specify that some documents should no longer be considered to be relevant—such as outdated legal agreements. In such an embodiment, the analysis might be limited to ordering documents in a category according to date of uploading, and also to performing a check to ensure that a document should still be considered for relevancy—i.e. has not been deemed irrelevant. Accordingly, it is contemplated that the newest document may not be the most relevant document.

The processing may further comprise assessing the subject or title of the document, as well as the body of the document, such as keywords comprised therein and their relative or absolute frequency and providing a determination of relevance. Weighting factors may be implemented such that, for example, the title of the document and/or particular characters—e.g. "v1", "v2" are afforded more weight with respect to proposed relevance than the words contained within the document, or some other property of the document. Where documents have titles comprising "v1" and "v2" for example, processing may determine that the document titled "v2" is more relevant than the document titled "v1". Optionally, the author may be able to set weighting for particular characters according to internal nomenclature. Further, other data sources could be processed to assess document relevance, such as user data. For example, an author could allow access to an email account and recent emails could be reviewed to enhance a determination of document relevance. Further, the processing module may have a classification module, as described above, that may comprise a trained neural network for processing the documents and generating a relevance score.

In an alternate embodiment, relevance may be customized to each recipient of a shared document. Properties relating to each recipient may be input by recipients as user information upon first logging into the system to establish their user credentials or upon retrieving a document. A recipient property might include access level, relating to a hierarchical organization of access permissions. Upon receiving a shared document, the analysis module of the server may only provide access to documents at or below the recipient's access level. In alternate embodiments, an author could set the access level of each recipient of their shared document. Further, a database may be relied on for providing recipient access levels, the contents of which may not be accessible to document authors or to recipients.

At block 214, if the document originally selected for sharing and linked to at block 208 ("the original shared document") was not determined to be the most relevant document by the processing module at block 212, the recipient will be prompted by a notification in the web interface whether they want to the original shared document or the more relevant document. Once the recipient chooses either the original shared document or the more relevant document, they may be given the option to download or otherwise access either document. Once the recipient chooses a document, the document may be downloaded to the recipient's device.

The recipient's choice can be recorded at the server, so that if the recipient again invokes the link at a later time, they may be directed to their same chosen document. Alternately, if the recipient re-invokes the link, they may again be prompted whether they prefer accessing the original shared document, or a more relevant document—which could be determined at that point by the processing module.

In embodiments, the server comprises an access module that stores an indication of whether a sharing link has been accessed and records user information relating to recipients having accessed the link. The author can access the web interface to determine which recipients have accessed each shared document (or merely accessed the link). Further, notifications may be sent to the author indicating when recipients access a shared document, or to indicate that particular recipients haven't yet accessed a shared document. Optionally, such a notification could be sent to the author after a predetermined time.

It will be appreciated that a client-side application 115 may be provided to interact with the server 102 over the web to provide the same functionality as described above, with some modifications that will be appreciated to those of skill in the art. A client-side application might provide for additional functionality to improve the user experience, including the provision of context menus in an operating system for uploading documents and providing other functionality, as well as integrating with resources stored at the author and recipient devices, such as local address books. Further, instead of an author having to upload a document and invoke a sharing mechanism to share the document, a client-side application could have access to the author's documents, and new documents could automatically be uploaded once saved to the author's computing device.

In embodiments, once a document is uploaded to the server, the author or optionally a recipient, can access the server to change at least some document information. Further, in embodiments, once a recipient has received a document for a particular category, the recipient can upload new documents that may be associated with the same category. Accordingly, the determination of relevance may not be limited to an analysis of documents in a category uploaded by a single author, but may extend to documents uploaded by users having received a shared document of a category.

In an alternate embodiment, instead of the author sharing a specific document, an author may select a category for sharing and the server may generate a link to the category itself. Upon invoking a link to the category a recipient may be directed to the most relevant document from the category.

Figure 3:
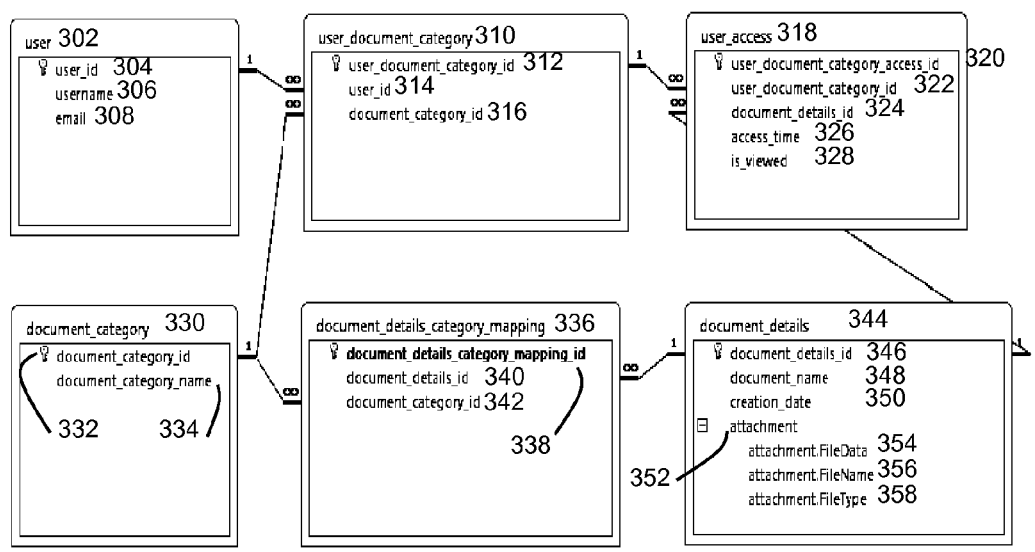
FIG. 3 shows a database architecture of a system for document management for sharing documents according to document category.

Referring now to FIG. 3, shown therein is an illustrative database architecture 300 of database 118 at server 102 for an embodiment of the system 100. The information in the various tables can be stored at a location accessible to server 102, optionally as document information 122.

The database architecture 300 comprises: user table 302 comprising user information; user_document_category table 310 comprising information relating users and document categories; user_access table 318 comprising information tracking document access by users; document_category table 330 comprising information relating to document categories; document_details_category_mapping 336 comprising information mapping documents to categories, wherein multiple documents can exist in a single category; and document_details table 344 comprising information on documents. The tables in the illustrative database architecture provide a relational database structure where key rows of information for each table provide unique identifiers (as illustrated). The rows in the database architecture comprising the suffix "_id" relate to identifiers. These identifiers may not be integer numbers, but merely need to be unique and can be a string or a globally unique identifier ("GUID") as well.

More specifically, the user table 302 user information for users, including user_id 304, username 306 and email address 308. The user_document_category 310 comprises user_document_category_id 314, user_id 314, and document_category_id 316. The user_access table 318 comprises user_document_category_access_id 320, user_document_category_id 322, document_details_id 324, access_time 326 and is_viewed 328. The document_category table 330 comprises a document_category_id 332 and a document_category_name 334. The document_details_category_mapping 336 comprises document_details_category_mapping_id 338, document_details_id 340 and document_category_id 342. The document_details table 344 comprises document_details_id 346, document_name 348, creation_date 350, and attachment 352. Attachment 352 comprises attachment.FileData 354, attachment.FileName 356 and attachment.FileType 358, each of which relate to a possible attachment associated with a document.

Figure 4:
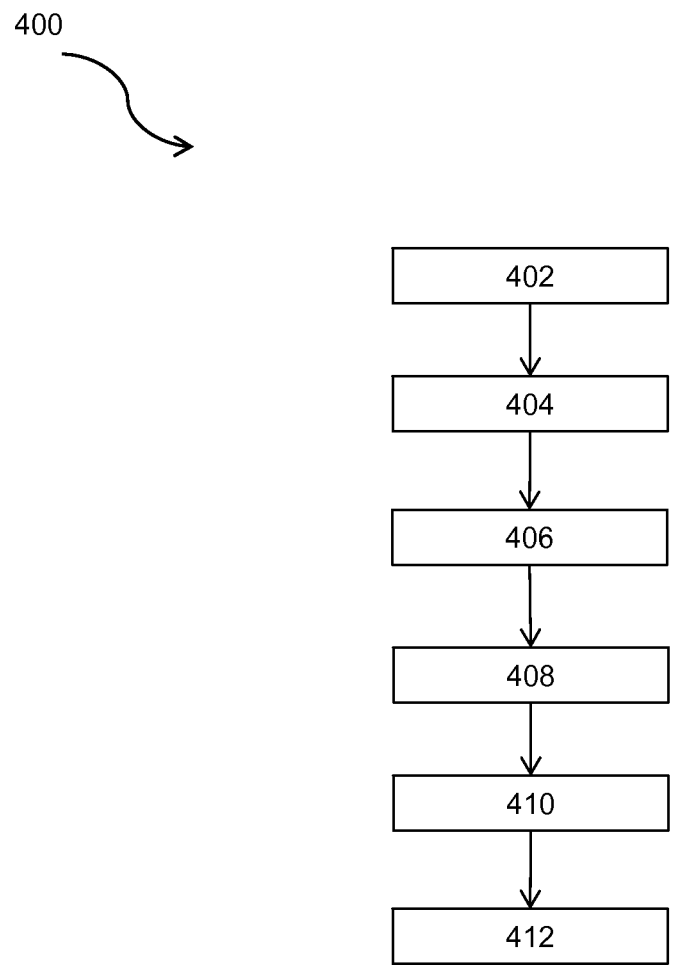
FIG. 4 shows a method for document management according to the architecture of FIG. 3

The database architecture 300 will now be described with reference to method 400, shown in FIG. 4, which provides a method for document management for an embodiment of the system 100.

At block 402, an author accesses the web interface of document management module 105 and uploads a document to the server. When a document is uploaded, its properties are stored in document_details 344. The author (and any recipient) may have to login with user credentials in order to access functionality provided at the server. User credentials facilitate tracking author and recipient user information and the association of such information with uploaded and shared documents. User credentials may be stored in the user table 302.

At block 404, when an author invokes the sharing mechanism for a particular file (whose properties are stored in document_details): a sharing link is generated and preferably sent to a recipient, optionally within an email; an entry is created in the user_document_category table indicating a category for the document with a document_category_id, which may be entered by the author; and, a corresponding entry is created in the user_access table indicating that an intended recipient has not viewed the document_details yet. Providing links to both user_document_category_id and document_details_id facilitates additional functionality, as described in more detail below. For example, may identify the most relevant version of the document that was originally shared with the user at the time a document was created. This further allows the system to compare stored documents and provide the user access to the original version of a shared document or a version of the document determined to be most relevant.

At block 406, when the recipient receives and invokes the link (e.g. by clicking on it), the processing module 106 matches the document_category_id to a stored document_category_id and finds the most relevant document associated with that document_category_id. The processing module retrieves document_details_id for the most relevant document. For an embodiment where relevancy is merely assessed based on recency, the server may locate the latest document_details associated with the document_category_id using the newest entry in the document_details_category_mapping. Further, in embodiments, the processing module 106 may locate the most recent document that has not been deemed to be irrelevant.

At block 408, document_details_id of the original shared document is compared against the document_details_id obtained at block 406. If the entries match, then the document associated with document_details_id may be displayed to the user. If the shared document_details_id does not match that obtained at block 406, then a more relevant document in the category of the shared document is available, such as a newer document from the category.

At block 410, the recipient may be issued a notification (such as a popup) in the web interface letting them know that a more relevant document is available. The popup may link the recipient to both the more relevant document in the document category and the original shared document, such that the recipient can choose to view the more relevant document or the original shared document.

User preferences may be stored, such that once a user declines to view the most relevant document, further notifications may not be displayed. User preferences might allow a recipient to choose to always see the notification (i.e. always giving them the option to view the shared document or the original shared document), to always see the original shared document, or to always view the most relevant document. The database in FIG. 3 does not reflect capturing user preferences, but a database can be extended to store such preferences.

At block 412, once a recipient selects a document, an entry may be created in the user_access table indicating which document was ultimately viewed by the user and when.

Each user may share documents in various categories. Further, a single document may be associated with multiple categories. Different categories might be updated at different frequencies. For example, a category comprising annual reports might only be updated once a year with more relevant documents, while a category comprising all reports might be updated more frequently. Where a document is associated with multiple categories, upon sharing a link to a document, the author may be prompted to select which category the shared document is intended to correspond to, so that the recipient is correctly prompted to view an updated document of the document category. Alternately, the recipient could receive a document belonging to multiple categories, and each of the categories could be checked for a more relevant document upon reception by the user—with an appropriate notification being issued to indicate that either or both of the categories comprises a more relevant document at the time that the recipient invokes the link.

The systems and methods described above are not limited to email links. The systems and methods can be implemented so that the sharing links can function as bookmarks. In such an embodiment, the link to a document provided to a recipient may be a Uniform Resource Locator ("URL") that the recipient can bookmark for ease of access. The URL may either include both document_category_id and document_details_id or just document_category_id. When a bookmarked sharing link is revisited, the most relevant document associated with document_category_id may be presented to the user and document_detail_id may be ignored. In this embodiment however, user details may not be known and the exact user_id viewing the document may not be recorded. In such embodiments, the systems and methods could be modified to record other details such as IP address of the recipient, if user ID information is not available. Further, where URLs are meant to be bookmarked, a popup notification could always be displayed—given that user preferences might not be stored—or never displayed—such that the most relevant document could always be provided to a recipient invoking the bookmarked URL.

Although the foregoing has been described with reference to certain specific embodiments, various modifications thereto will be apparent to those skilled in the art without departing from the spirit and scope of the invention as outlined in the appended claims. For example, the word "document" was used to enhance clarity of illustration, but it will be appreciated that various embodiments of the systems and methods could be applied generally to the sharing of electronic files.

The invention claimed is:

1. A system for sharing electronic documents, the system comprising:
    a hardware server;
    an electronic document repository configured to store a plurality of documents and a document category index for assigning at least one of a plurality of document categories to each of the plurality of documents; and
    a document management module, hosted by the hardware server, communicatively linked to the electronic document repository, the document management module configured to:
        receive, from an author device, one or more documents each having document content and document properties and store the received one or more documents to the electronic document repository;
        receive a request to share a document selected from the stored one or more documents;
        share the document by generating a sharing link and communicating the sharing link to a recipient device;
        obtain, in response to the recipient device accessing the sharing link, a request to access to the shared document;
        in response to the obtaining the request to access the shared document:
            generate relevance scores for the shared document and each document having a common document category with the shared document;
            determine a most relevant document within the common document category by comparing the relevance scores; and
            communicate a notification to the recipient device identifying the shared document and the most relevant document;
        receive a selection on the notification from the recipient device indicating a preference to either access to the shared document or the most relevant document; and
        provide the shared document or the most relevant document to the recipient device according to the selection received from the recipient device.

2. The system of claim 1, wherein the document management module receives a document category for the received one or more documents from the author device.

3. The system of claim 1, wherein the document management module processes the received one or more documents to generate a document category from a predetermined list of categories for each of the one or more documents.

4. The system of claim 1, wherein the system further comprises a neural network for classifying each of the stored one or more documents into a category from a predetermined list of categories.

5. The system of claim 1, wherein the generating relevance scores further comprises comparing the document content of each document.

6. The system of claim 1, wherein the generating relevance scores comprises:
    receiving user data relating to a user of the recipient device from a data repository; and
    processing the user data to customize the relevance scores for the user.

7. The system of claim 1, wherein the document properties comprise an upload date to the document repository and the generating relevance scores further comprises comparing the upload date of each of the stored one or more documents.

8. The system of claim 1, wherein the generating relevance scores comprises comparing the document properties according to at least one weighting factor.

9. The system of claim 8, wherein the at least one weighting factor is preconfigured at the document management module or is received from the author device or the recipient device.

10. The system of claim 1, wherein the selection is recorded, and upon receiving a request to access the shared document at a later time, either the shared document or a document determined to be the most relevant document at the later time is provided to the recipient device according to the selection.

11. The system of claim 1, further comprising an access module for recording whether the shared document has been accessed, and for generating a notification for communication to the author device after a predetermined time that the recipient device has not requested to access the shared document.

12. A method for sharing electronic documents, the method comprising:
    establishing an electronic document repository configured to store a plurality of documents, and a document category index for assigning at least one of a plurality of document categories to each of the plurality of stored documents; and
    receiving from an author device, at a document management module, one or more documents each having document content and document properties and storing the one or more documents to the electronic document repository;
    receiving a request to share a document selected from the stored one or more documents;

sharing the document by generating a sharing link and communicating the sharing link to a recipient device;

obtaining, in response to the recipient device accessing the sharing link, a request to access the shared document;

in response to the obtaining the request to access the shared document:

generating relevance scores for the shared document and each document having a common document category with the shared document;

determining a most relevant document with the common document category by comparing the relevance scores; and communicating a notification to the recipient device identifying the shared document and the most relevant document;

receiving a selection on the notification, from the recipient device, indicating a preference to either access to the shared document or the most relevant document; and providing the shared document or the most relevant document to the recipient device according to the selection received from the recipient device.

13. The method of claim 12, wherein the generating relevance scores further comprises comparing the document content of each of the stored one or more documents.

14. The method of claim 12, wherein the document properties comprise an upload date to the document repository and the generating relevance scores further comprises comparing the upload date of each of the one or more documents.

15. The method of claim 12, wherein the generating relevance scores comprises comparing the document properties according to at least one weighting factor.

16. The method of claim 12, further comprising an access module for recording whether the shared document has been accessed, and for generating a notification for communication to the author device after a predetermined time that the recipient device has not requested to access the shared document.

* * * * *